United States Patent
Hanna

(10) Patent No.: US 10,997,411 B2
(45) Date of Patent: *May 4, 2021

(54) LENS SYSTEM FOR HIGH QUALITY VISIBLE IMAGE ACQUISITION AND INFRA-RED IRIS IMAGE ACQUISITION

(71) Applicant: Eyelock LLC, New York, NY (US)

(72) Inventor: Keith J. Hanna, Bronxville, NY (US)

(73) Assignee: Eyelock LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/124,614

(22) Filed: Sep. 7, 2018

(65) Prior Publication Data
US 2020/0026918 A1    Jan. 23, 2020

Related U.S. Application Data

(63) Continuation of application No. 15/000,816, filed on Jan. 19, 2016, now Pat. No. 10,074,011.
(Continued)

(51) Int. Cl.
*G02B 5/20* (2006.01)
*G02B 5/22* (2006.01)
(Continued)

(52) U.S. Cl.
CPC ........... *G06K 9/00604* (2013.01); *G02B 3/10* (2013.01); *G02B 5/20* (2013.01); *G02B 13/146* (2013.01); *H04N 5/332* (2013.01)

(58) Field of Classification Search
CPC .......... G02B 1/041; G02B 1/043; G02B 5/00; G02B 5/003; G02B 5/20; G02B 5/201;
(Continued)

(56) References Cited

U.S. PATENT DOCUMENTS

| 4,641,349 A | 2/1987 | Flom et al. |
| 5,259,040 A | 11/1993 | Hanna |

(Continued)

FOREIGN PATENT DOCUMENTS

| WO | WO-2010/062371 | 6/2010 |
| WO | WO-2011/093538 | 8/2011 |

(Continued)

OTHER PUBLICATIONS

B. Galvin, et al., Recovering Motion Fields: An Evaluation of Eight Optical Flow Algorithms, Proc. of the British Machine Vision Conf. (1998) (pp. 195-204).
(Continued)

*Primary Examiner* — Thong Q Nguyen
(74) *Attorney, Agent, or Firm* — Foley and Lardner LLP

(57) ABSTRACT

This disclosure is directed to systems and methods for acquiring IR light and visible light images. A lens may be configured to operate in at least a first configuration and a second configuration. The lens may have a first filter over a first portion of the lens and a second filter over a second portion of the lens. In the first configuration, a third filter may operate with the lens and the second filter to allow visible light from a first object located beyond a predetermined distance from the lens to pass and be focused on a sensor for image acquisition. In the second configuration, a fourth filter may operate with the lens and the first filter to allow IR light from a second object located within the predetermined distance to pass and be focused on the sensor for image acquisition.

20 Claims, 8 Drawing Sheets

Related U.S. Application Data

(60) Provisional application No. 62/105,691, filed on Jan. 20, 2015.

(51) Int. Cl.
*G06K 9/00* (2006.01)
*G02B 13/14* (2006.01)
*H04N 5/33* (2006.01)
*G02B 3/10* (2006.01)

(58) Field of Classification Search
CPC ........ G02B 5/204; G02B 5/205; G02B 5/208;
G02B 5/22; G02B 5/286; G02B 5/28;
G02B 5/281; G02B 5/282; G02B 5/283;
G06K 9/00604
See application file for complete search history.

(56) References Cited

U.S. PATENT DOCUMENTS

| | | |
|---|---|---|
| 5,291,560 A | 3/1994 | Daugman |
| 5,488,675 A | 1/1996 | Hanna |
| 5,572,596 A | 11/1996 | Wildes et al. |
| 5,581,629 A | 12/1996 | Hanna et al. |
| 5,613,012 A | 3/1997 | Hoffman et al. |
| 5,615,277 A | 3/1997 | Hoffman |
| 5,737,439 A | 4/1998 | Lapsley et al. |
| 5,764,789 A | 6/1998 | Pare et al. |
| 5,802,199 A | 9/1998 | Pare et al. |
| 5,805,719 A | 9/1998 | Pare et al. |
| 5,838,812 A | 11/1998 | Pare et al. |
| 5,901,238 A | 5/1999 | Matsushita |
| 5,953,440 A | 9/1999 | Zhang et al. |
| 5,978,494 A | 11/1999 | Zhang |
| 6,021,210 A | 2/2000 | Camus et al. |
| 6,028,949 A | 2/2000 | McKendall |
| 6,064,752 A | 5/2000 | Rozmus et al. |
| 6,069,967 A | 5/2000 | Rozmus et al. |
| 6,144,754 A | 11/2000 | Okano et al. |
| 6,192,142 B1 | 2/2001 | Pare et al. |
| 6,247,813 B1 | 6/2001 | Kim et al. |
| 6,252,977 B1 | 6/2001 | Salganicoff et al. |
| 6,289,113 B1 | 9/2001 | McHugh et al. |
| 6,366,682 B1 | 4/2002 | Hoffman et al. |
| 6,373,968 B2 | 4/2002 | Okano et al. |
| 6,377,699 B1 | 4/2002 | Musgrave et al. |
| 6,424,727 B1 | 7/2002 | Musgrave et al. |
| 6,483,930 B1 | 11/2002 | Musgrave et al. |
| 6,532,298 B1 | 3/2003 | Cambier et al. |
| 6,542,624 B1 | 4/2003 | Oda |
| 6,546,121 B1 | 4/2003 | Oda |
| 6,594,376 B2 | 7/2003 | Hoffman et al. |
| 6,594,377 B1 | 7/2003 | Kim et al. |
| 6,652,099 B2 | 11/2003 | Chae et al. |
| 6,700,998 B1 | 3/2004 | Murata |
| 6,714,665 B1 | 3/2004 | Hanna et al. |
| 6,760,467 B1 | 7/2004 | Min et al. |
| 6,850,631 B1 | 2/2005 | Oda et al. |
| 6,917,695 B2 | 7/2005 | Teng et al. |
| 6,980,670 B1 | 12/2005 | Hoffman et al. |
| 6,985,608 B2 | 1/2006 | Hoffman et al. |
| 7,095,901 B2 | 8/2006 | Lee et al. |
| 7,146,027 B2 | 12/2006 | Kim et al. |
| 7,248,719 B2 | 7/2007 | Hoffman et al. |
| 7,271,939 B2 | 9/2007 | Kono |
| 7,385,626 B2 | 6/2008 | Aggarwal et al. |
| 7,414,737 B2 | 8/2008 | Cottard et al. |
| 7,418,115 B2 | 8/2008 | Northcott et al. |
| 7,428,320 B2 | 9/2008 | Northcott et al. |
| 7,542,590 B1 | 6/2009 | Robinson et al. |
| 7,558,406 B1 | 7/2009 | Robinson et al. |
| 7,558,407 B2 | 7/2009 | Hoffman et al. |
| 7,574,021 B2 | 8/2009 | Matey |
| 7,579,577 B2 * | 8/2009 | Ono .................... G02B 5/26 |
| | | 250/208.1 |
| 7,583,822 B2 | 9/2009 | Guillemot et al. |
| 7,606,401 B2 | 10/2009 | Hoffman et al. |
| 7,616,788 B2 | 11/2009 | Hsieh et al. |
| 7,621,636 B2 | 11/2009 | Su et al. |
| 7,639,840 B2 | 12/2009 | Hanna et al. |
| 7,693,307 B2 | 4/2010 | Rieul et al. |
| 7,697,786 B2 | 4/2010 | Camus et al. |
| 7,715,595 B2 | 5/2010 | Kim et al. |
| 7,719,566 B2 | 5/2010 | Guichard |
| 7,797,606 B2 | 9/2010 | Chabanne |
| 7,869,627 B2 | 1/2011 | Northcott et al. |
| 7,929,732 B2 | 4/2011 | Bringer et al. |
| 7,978,883 B2 | 7/2011 | Rouh et al. |
| 8,009,876 B2 | 8/2011 | Kim et al. |
| 8,025,399 B2 | 9/2011 | Northcott et al. |
| 8,092,021 B1 | 1/2012 | Northcott et al. |
| 8,132,912 B1 | 3/2012 | Northcott et al. |
| 8,170,295 B2 | 5/2012 | Fujii et al. |
| 8,233,680 B2 | 7/2012 | Bringer et al. |
| 8,243,133 B1 | 8/2012 | Northcott et al. |
| 8,279,042 B2 | 10/2012 | Beenau et al. |
| 8,317,325 B2 | 11/2012 | Raguin et al. |
| 8,416,303 B2 * | 4/2013 | Gomi ............... G06K 9/00899 |
| | | 348/164 |
| 10,074,011 B2 * | 9/2018 | Hanna ............... G06K 9/00604 |
| 2005/0084137 A1 | 4/2005 | Kim et al. |
| 2006/0074986 A1 | 4/2006 | Mallalieu et al. |
| 2007/0211922 A1 | 9/2007 | Crowley et al. |
| 2008/0308712 A1 | 12/2008 | Ono |
| 2009/0074256 A1 | 3/2009 | Haddad |
| 2009/0097715 A1 | 4/2009 | Cottard et al. |
| 2009/0161925 A1 | 6/2009 | Cottard et al. |
| 2009/0231096 A1 | 9/2009 | Bringer et al. |
| 2010/0021016 A1 | 1/2010 | Cottard et al. |
| 2010/0074477 A1 | 3/2010 | Fujii et al. |
| 2010/0127826 A1 | 5/2010 | Saliba et al. |
| 2010/0128129 A1 | 5/2010 | Kim |
| 2010/0128937 A1 | 5/2010 | Yoo et al. |
| 2010/0246903 A1 | 9/2010 | Cottard |
| 2010/0278394 A1 | 11/2010 | Raguin et al. |
| 2010/0310070 A1 | 12/2010 | Bringer et al. |
| 2011/0158486 A1 | 6/2011 | Bringer et al. |
| 2011/0194738 A1 | 8/2011 | Choi et al. |
| 2011/0277518 A1 | 11/2011 | Lais et al. |
| 2012/0240223 A1 | 9/2012 | Tu |
| 2012/0257797 A1 | 10/2012 | Leyvand et al. |
| 2013/0063641 A1 | 3/2013 | Venezia et al. |
| 2013/0188057 A1 | 7/2013 | Lin |
| 2014/0099005 A1 * | 4/2014 | Mogi ............... G06K 9/00288 |
| | | 382/118 |
| 2014/0132775 A1 | 5/2014 | Fischer et al. |
| 2017/0140221 A1 * | 5/2017 | Ollila .................. G06K 9/2018 |

FOREIGN PATENT DOCUMENTS

| | | |
|---|---|---|
| WO | WO-2014/081106 A1 | 5/2014 |
| WO | WO-2014/205021 A1 | 12/2014 |

OTHER PUBLICATIONS

Communication pursuant to Article 94(3) EPC other than Search Report on EP 16740566.1 dated Aug. 2, 2019.
Foreign Action other than Search Report on EP 16740566.1 dated Aug. 6, 2020.
Foreign Action other than Search Report on IN 201717026236 dated Aug. 27, 2020.
International Search Report and Written Opinion of the International Searching Authority on PCT/US2016/013840 dated May 2, 2016.
J. R. Bergen, et al., Hierarchical Model-Based Motion Estimation, European Conf. on Computer Vision (1993) (pp. 237-252).
K. Nishino, et al., The World in an Eye, IEEE Conf. on Pattern Recognition, vol. 1, at pp. 444-51 (Jun. 2004).
Notice of Allowance 101546-0260 dated May 10, 2018.
R. Kumar, et al., Direct recovery of shape from multiple views: a parallax based approach, 12th IAPR Int'l Conf. On Pattern Recognition (1994)(pp. 1-5).

(56) References Cited

OTHER PUBLICATIONS

Supplementary Search Report on EP 16740566.1 dated Aug. 16, 2018.
U.S. Notice of Allowance on U.S. Appl. No. 15/000,816 dated May 10, 2018.
Written Opinion of the International Searching Authority on PCT/US2016/013840 dated May 2, 2016.
Communication pursuant to Rules 70(2) and 70a(2) EPC related to EP 16740566.1 dated Sep. 4, 2018.

* cited by examiner

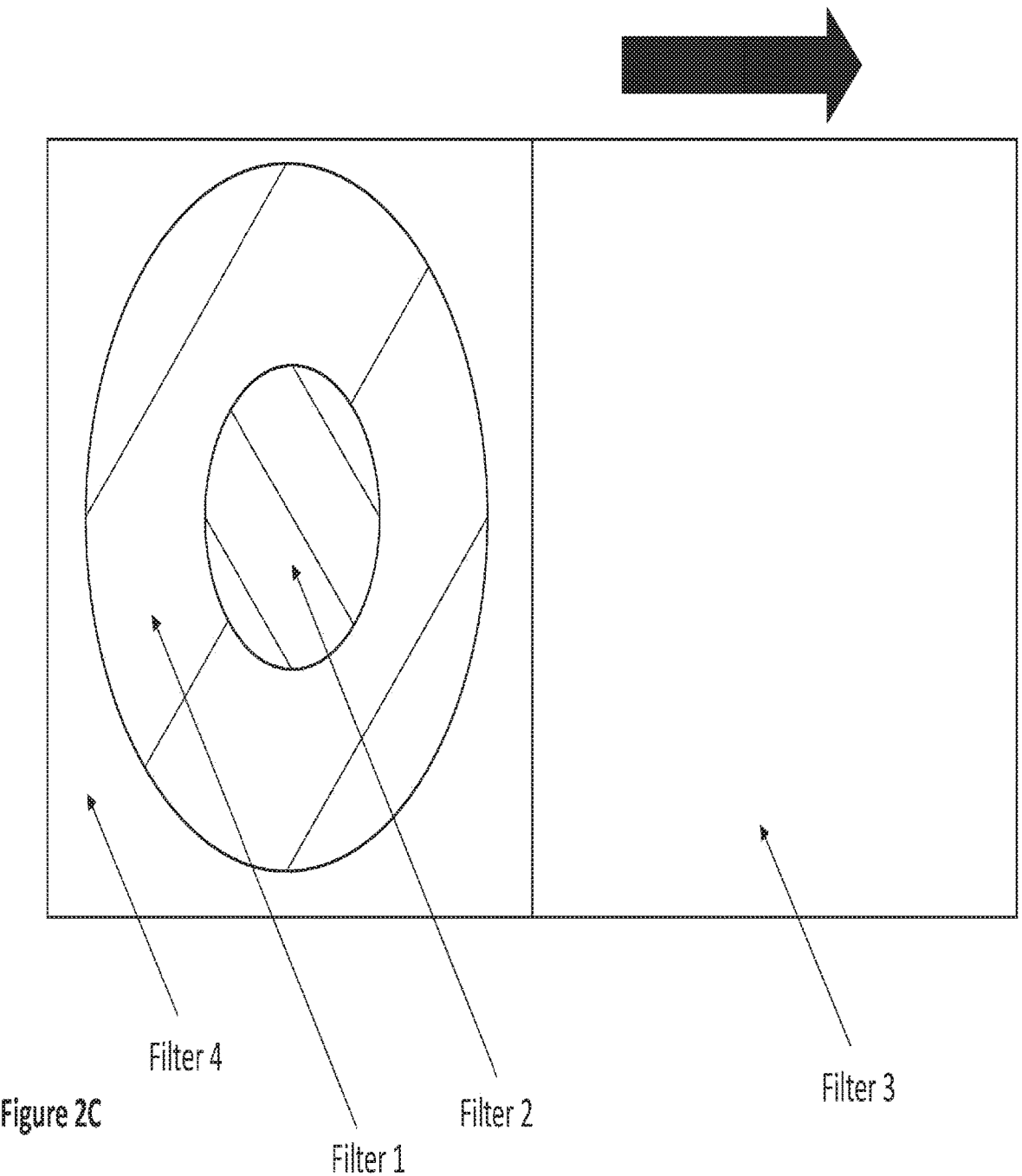

LENS SYSTEM FOR HIGH QUALITY VISIBLE IMAGE ACQUISITION AND INFRA-RED IRIS IMAGE ACQUISITION

RELATED APPLICATIONS

This application is a U.S. continuation application of, and claims priority to U.S. application Ser. No. 15/000,816, filed Jan. 19, 2016, entitled "LENS SYSTEM FOR HIGH QUALITY VISIBLE IMAGE ACQUISITION AND INFRA-RED IRIS IMAGE ACQUISITION", issued as U.S. Pat. No. 10,074,011 on Sep. 11, 2018, which claims priority to and the benefit of U.S. Provisional Application No. 62/105,691, filed Jan. 20, 2015, entitled "LENS SYSTEM FOR HIGH QUALITY VISIBLE IMAGE ACQUISITION AND INFRA-RED IRIS IMAGE ACQUISITION", each of which is incorporated herein by reference in its entirety for all purposes.

FIELD OF THE DISCLOSURE

This disclosure relates generally to systems and methods for image acquisition. In particular, this disclosure relates to systems and methods of using filters to acquire visible light and infra-red (IR) light images.

BACKGROUND

The diversity and number of computing devices have increased significantly in recent times. For example, there are portable devices such as laptops and tablets, and traditional desk-bound computing platforms. Some of these devices may include embedded cameras, but these cameras are typically configured in a manner unsuitable for acquiring iris biometric data for authentication purposes.

SUMMARY

In some aspects, the disclosure is directed at methods and systems of using a sensor to acquire biometric and non-biometric images using a combination of filters over a lens. Pairs of the filters can combine over different portions of the lens to pass infra-red or visible light. Therefore, the filters can selectively pass infra-red light through the lens for acquisition of biometric images, and can selectively pass visible light through the lens for acquisition of non-biometric images. Portions of the lens may be configured to support a first depth of field for objects being imaged using IR light, and to support a second depth of field for objects being imaged using visible light. For instance, the sensor may acquire an image of an iris based on a first imaging configuration. The iris may be located within a predetermined distance relative to the sensor. The first imaging configuration may include a first filter over a first portion of a lens coupled to the sensor, and a second filter over at least the first portion that combine with the first filter to allow infra-red light from the iris to pass to the sensor. The sensor may acquire an image of an object based on a second imaging configuration. The object may be located beyond the predetermined distance. The second imaging configuration may include a third filter over a second portion of the lens, and a fourth filter replaces the second filter to combine with the third filter to allow visible light from the object to pass to the sensor.

In one aspect, this disclosure describes a system for acquiring IR light and visible light images. The system may include a sensor and a lens. The lens may be configured to operate in at least a first configuration and a second configuration. The lens may have a first filter over a first portion of the lens and a second filter over a second portion of the lens. In the first configuration, a third filter may operate with the lens and the second filter to allow visible light from a first object located beyond a predetermined distance from the lens to pass and be focused on the sensor for image acquisition. In the second configuration, a fourth filter may operate with the lens and the first filter to allow IR light from a second object located within the predetermined distance to pass and be focused on the sensor for image acquisition.

In some embodiments, the second object located within the predetermined distance comprises an iris for biometric acquisition. At least one of the second filter or the third filter may include a band-pass filter configured to allow light of wavelength from 400 nm to 700 nm to pass. At least one of the first filter or the fourth filter may include a band-pass filter configured to allow light of wavelength from 750 nm to 860 nm to pass. The lens may be disposed at a fixed distance from the sensor in the first configuration and the second configuration.

In certain embodiments, the second portion of the lens comprises a central disk portion of the lens facing the sensor, and the first portion of the lens comprises an annulus portion around the central disk portion. Only one of the third filter or the fourth filter may be operative over the lens at a given time. The system may further comprise an IR light source, the IR light source configured to illuminate the second object for image acquisition in the second configuration. The system may further comprise a second lens coupled to the third filter or the fourth filter. The second lens may be configured to assist the lens in focusing the visible light onto the sensor if coupled to the third filter, or focusing the IR light onto the sensor if coupled to the fourth filter. In some embodiments, at least one of the first filter or the second filter is deposited on the lens.

In another aspect, this disclosure describes a method for acquiring IR light and visible light images. The method may include operating a lens in a first configuration, the lens having a first filter over a first portion of the lens and a second filter over a second portion of the lens. Operating in the first configuration may include operating the lens with a third filter and the second filter to allow visible light from a first object located beyond a predetermined distance from the lens to pass and be focused on a sensor for image acquisition. The method may include operating the lens in a second configuration. Operating in the second configuration may comprise operating the lens with a fourth filter and the first filter to allow IR light from a second object located within the predetermined distance to pass and be focused on the sensor for image acquisition.

In some embodiments, the sensor acquires, in the second configuration, an image of the second object located within the predetermined distance, the second object comprising an iris for biometric acquisition. At least one of the second filter or the third filter may allow light of wavelength from 400 nm to 700 nm to pass. The at least one of the second filter or the third filter may comprise a band-pass filter. At least one of the first filter or the fourth filter may allow light of wavelength from 750 nm to 860 nm to pass. The at least one of the first filter or the fourth filter may comprise a band-pass filter. The lens may be maintained at a fixed distance from the sensor in the first configuration and the second configuration.

In certain embodiments, the second portion of the lens comprises a central disk portion of the lens facing the sensor. The first portion of the lens may comprise an annulus portion around the central disk portion. One of the third filter or the fourth filter may be operatively positioned or otherwise activated over the lens at a given time. An IR light source may illuminate the second object for image acquisition in the second configuration. The method may include operating a second lens coupled to the third filter or the fourth filter, to assist the lens in focusing the visible light onto the sensor if coupled to the third filter, or in focusing the IR light onto the sensor if coupled to the fourth filter. In some embodiments, at least one of the first filter or the second filter is deposited on the lens.

BRIEF DESCRIPTION OF THE DRAWINGS

The following figures depict certain illustrative embodiments of the methods and systems described herein, where like reference numerals refer to like elements. Each depicted embodiment is illustrative of these methods and systems and not limiting.

FIG. 2C is a schematic drawing illustrative of another configuration of one embodiment of a system for acquiring biometric and/or non-biometric images, shown in a front view relative to a lens;

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for acquiring visible light and IR light images.

A. Network and Computing Environment

Figure 1A:
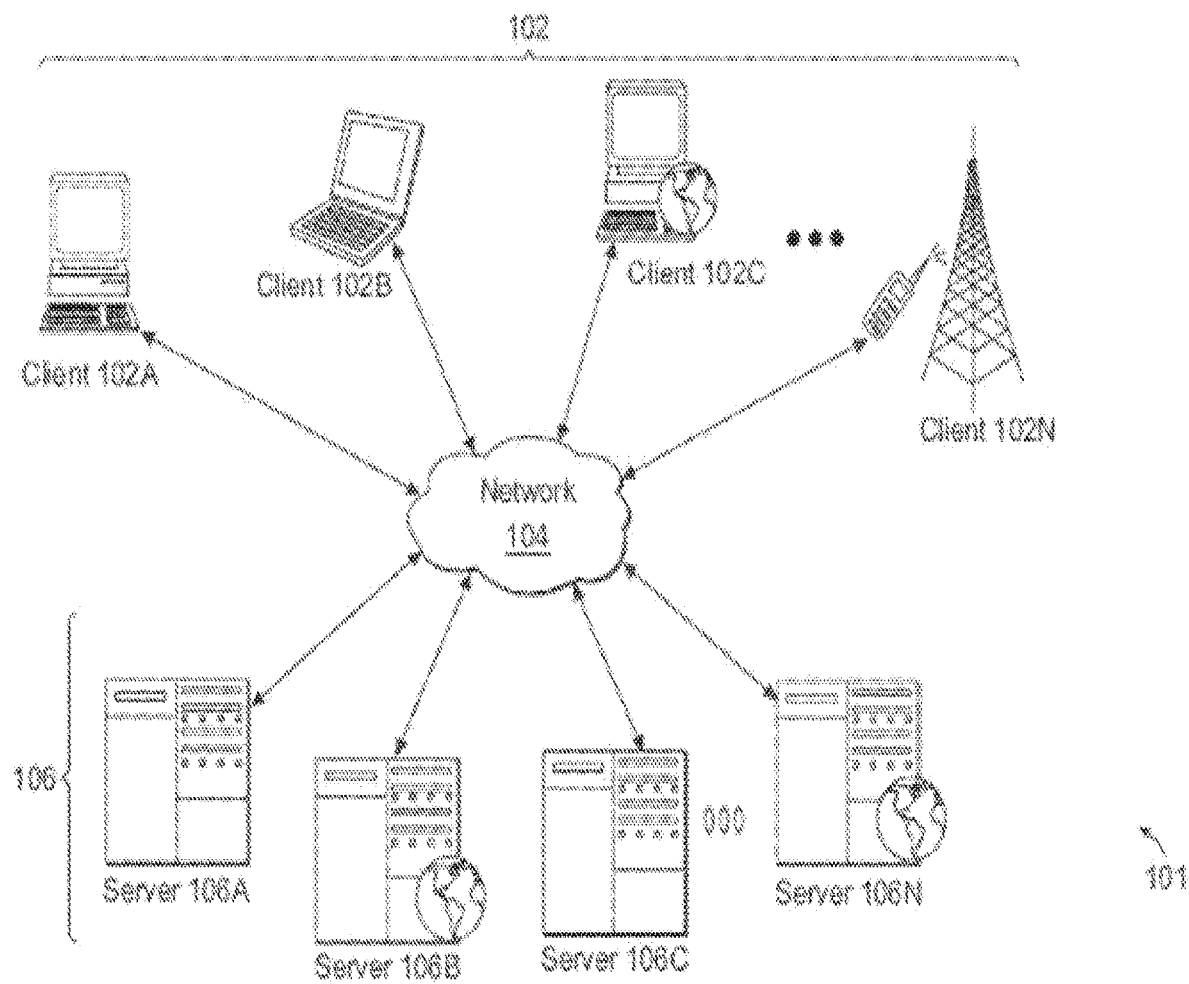
FIG. 1A is a block diagram illustrative of an embodiment of a networked environment with a client machine that communicates with a server.

Before addressing specific embodiments of the present solution, a description of system components and features suitable for use in the present systems and methods may be helpful. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
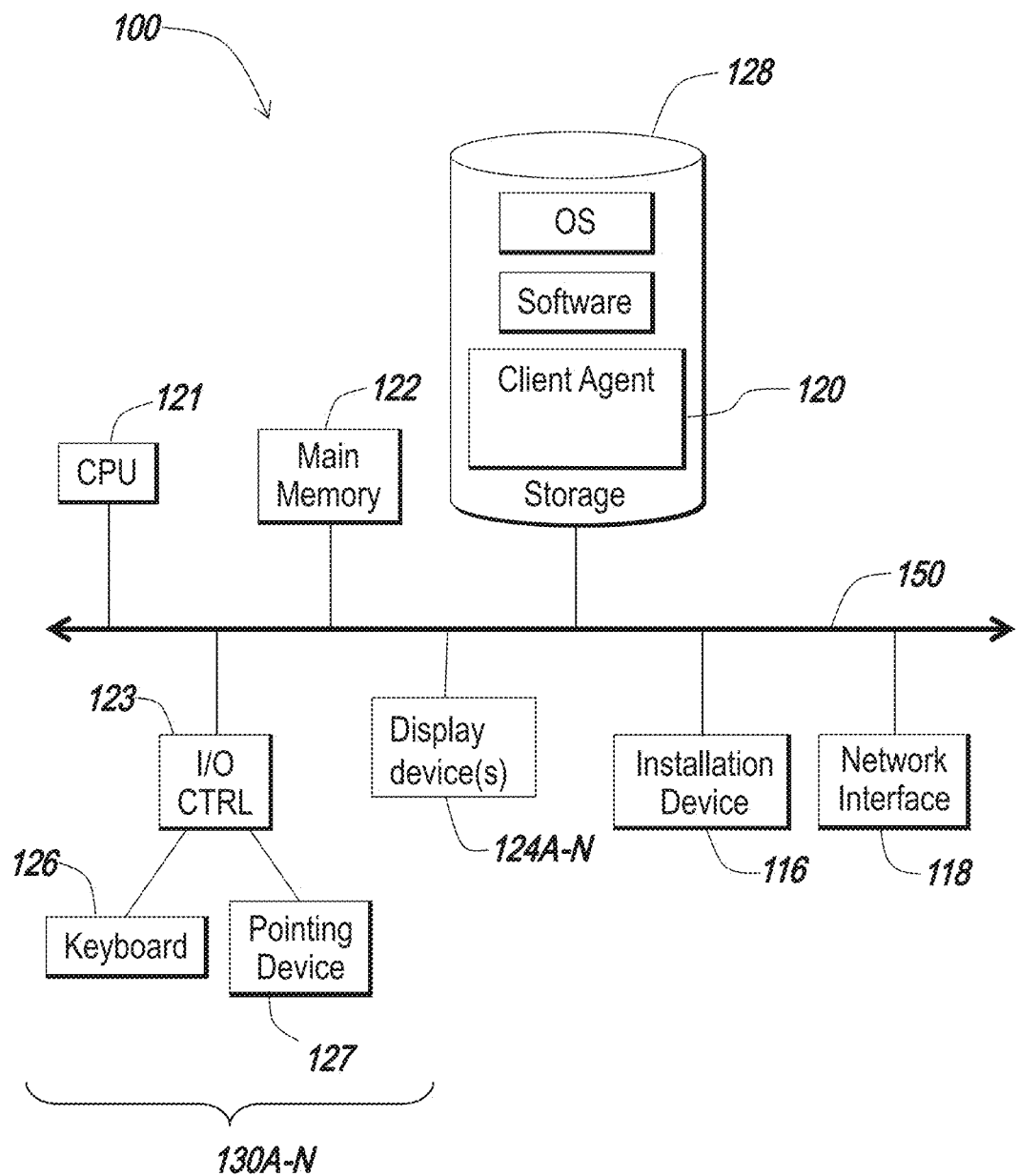
FIGS. 1B and 1C are block diagrams illustrative of embodiments of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
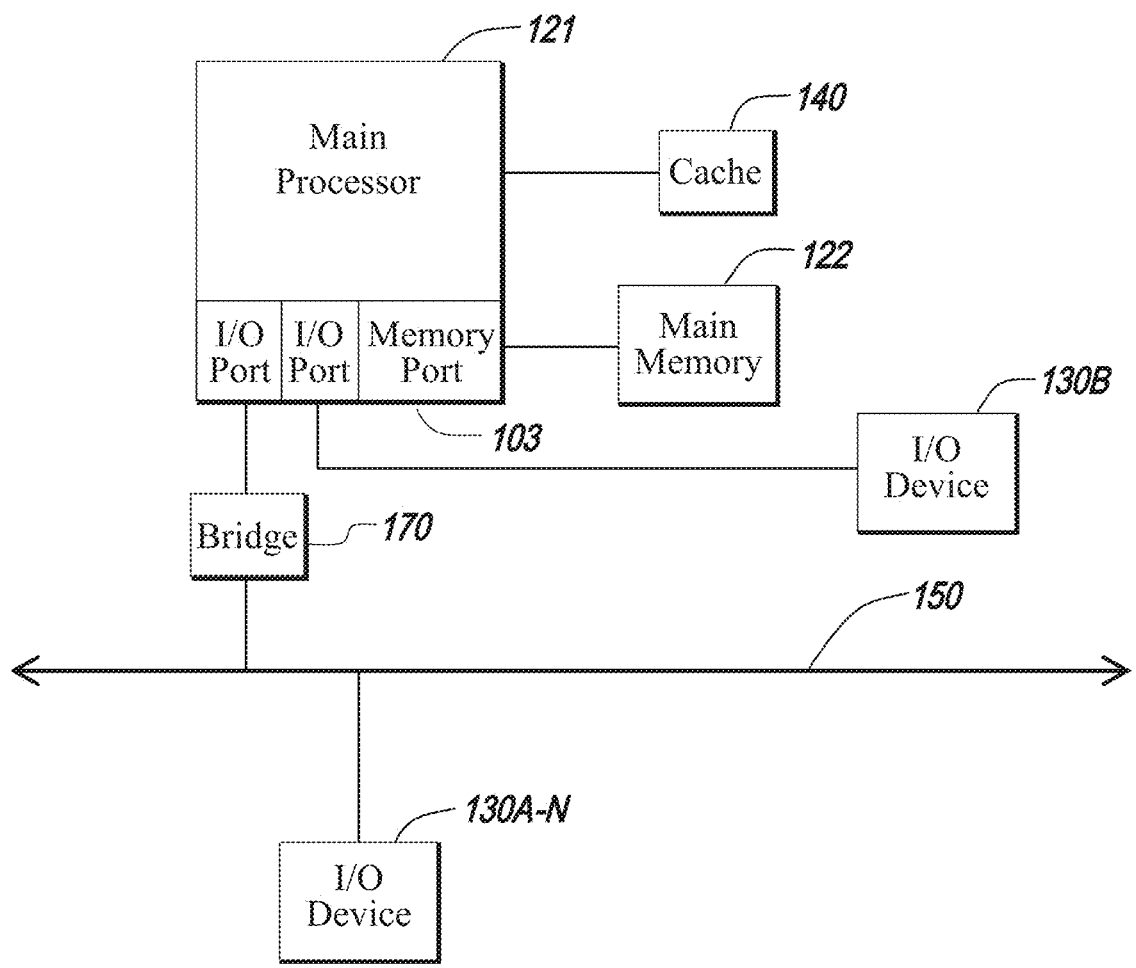

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. Acquiring Visible Light and IR Light Images

In some aspects, the disclosure is directed at methods and systems of using a sensor to acquire biometric and non-biometric images using a combination of filters over a lens. Pairs of the filters can combine over different portions of the lens to pass infra-red or visible light. Therefore, the filters can selectively pass infra-red light through the lens for acquisition of biometric images, and can selectively pass visible light through the lens for acquisition of non-biometric images. Portions of the lens may be configured to support a first depth of field for objects being imaged using IR light, and to support a second depth of field for objects being imaged using visible light. For instance, the sensor may acquire an image of an iris based on a first imaging configuration. The iris may be located within a predetermined distance relative to the sensor. The first imaging configuration may include a first filter over a first portion of a lens coupled to the sensor, and a second filter over at least the first portion that combine with the first filter to allow infra-red light from the iris to pass to the sensor. The sensor may acquire an image of an object based on a second imaging configuration. The object may be located beyond the predetermined distance. The second imaging configuration may include a third filter over a second portion of the lens, and a fourth filter replaces the second filter to combine with the third filter to allow visible light from the object to pass to the sensor.

Embodiments of the present methods and systems may allow a single sensor or camera, and/or a single lens, to acquire biometrics (e.g., iris information) and images of other objects. The sensor may be coupled to a lens to acquire biometric and non-biometric images using a combination of filters. Pairs of the filters may combine over different portions of a lens to pass infra-red or visible light. Particular pairs of the filters may combine under a first imaging configuration for acquiring biometric (e.g., IR) images. Other pairs of the filters may combine under a second imaging configuration for acquiring non-biometric (e.g., visible light) images.

In some embodiments, a system may comprise a lens that is capable of focusing within a mid to far range (e.g., depth of field of 20" to infinity) in the visible wavelength of light and also capable of focusing at a near range (e.g., a depth of field of 10", 1", 3", 5", 8", 12", 15", 18", etc.) in the infra-red (IR) wavelength of light. The system may include a sensor for image acquisition. The system may include a filter layer on a subset (e.g., a first portion) of the lens and a filter layer external to the lens such that the combination of the two filters are configured to be IR-cut or visible-pass, or allows only visible illumination to pass through to the sensor. The system may include a filter layer on another portion of the lens, and another filter layer external to the lens such that the combination of the two latter filters are configured to be IR-pass or visible-cut, or allows only infrared illumination to pass through to the sensor. In some embodiments, the mid to far range may include a depth of field of for example, 10", 12", 15", 18", 20", 25", 30", 35", 40" or otherwise, to 50", 100", 150", 200", 300", 500", infinity or otherwise. In some embodiments, the mid to far range does not overlap with the near range. In certain embodiments, the mid range (of the mid to far range) abuts or overlaps with the near range. One or both of the external filter layers may be movable or removable relative to the lens. For instance, the external filter layer on the first portion of the lens may slide over, or be moved relative to any portion of the lens or the whole lens.

In some embodiments, the system may be coupled to or incorporated into a computing device, such as any embodiment of the computing device 100, 102, 103 described above in connection with FIG. 1A-1C. For example, a main processor or CPU 121 may operate the sensor and/or external filter layers, and may generate and/or process an image acquired via the sensor. The main processor or CPU 121 may control illumination (IR and/or visible) for image acquisition.

In some implementations, iris recognition uses imagery of the iris that is at least 100 pixels in diameter and uses IR illumination, according to some ISO specifications for the iris. In some embodiments, however, the field of view of a sensor (e.g., for a typical visible spectrum webcam) is such that a target subject or a user has to be approximately 10" from the sensor in order to achieve 100 pixels across the subject's iris. The visible spectrum webcam, however, may be configured to have focal lengths that provide a depth of field that is approximately 20" to infinity, to acquire images of objects.

In some embodiments, the lens system comprises at least two portions or settings. These portions or settings may sometimes be referred as imaging configurations or imaging modes.

The first portion or setting may include or correspond to a lens portion (e.g., first lens portion) that has a focal length that allows a sharp image of an iris in infra-red light to be focused on a sensor when the iris is located at a near distance (e.g., 10", 1", 3", 5", 8", 12", 15", 18", etc., from the lens) from the lens, sensor or system. In some embodiments, the first portion/setting may include a filter layer (e.g., filter 1) located over a same lens portion as a filter layer external (e.g., filter 4) to the lens. The combination of the two filter layers may be such that visible illumination is attenuated, and/or such that infra-red illumination suitable for iris recognition is allowed to pass through this lens portion. The infra-red illumination band that is allowed to pass may be 750-860 nm for example. In some embodiments, one or both of the aforementioned filter layers under the first setting may be a band-pass filter for light of any wavelength within 750-860 nm, for example. In other embodiments, the IR-pass band may be between 680 nm, 700 nm, 720 nm, 725 nm, 750 nm, 770 nm or otherwise, to 800 nm, 820 nm, 840 nm, 860 nm, 880 nm, 900 nm or otherwise, for example.

The second portion or setting may include or correspond to a second or different lens portion to the aforementioned first portion, that has a focal length that allows a sharp image of object(s) in visible light to be focused on a sensor when objects are at a mid to far distance from the lens, sensor or system. The second lens portion may be non-overlapping with the first lens portion, and may abut at least a portion of the first lens portion. In some embodiments, the second portion of the lens may be coupled to a filter layer (e.g., filter 2), and a filter layer external (e.g., filter 3) to the lens such that the combination of the latter two filter layers is such that infra-red illumination is attenuated and/or such that visible illumination suitable for viewing objects by humans is allowed to pass through or within the second portion of the lens. The visible illumination band that is allowed to pass may be 400-700 nm, for example. In some embodiments, one or both filter layers under the second setting may be a band-pass filter of light of any wavelength from 400-700 nm, for example. In other embodiments, the IR-pass band may be between 250 nm, 300 nm, 350 nm, 400 nm, 450 nm, 500 nm, 550 nm, 600 nm or otherwise, to 600 nm, 650 nm, 700 nm, 850 nm, 900 nm, 950 nm, 1000 nm, 1200 nm or otherwise, for example.

Figure 2A:
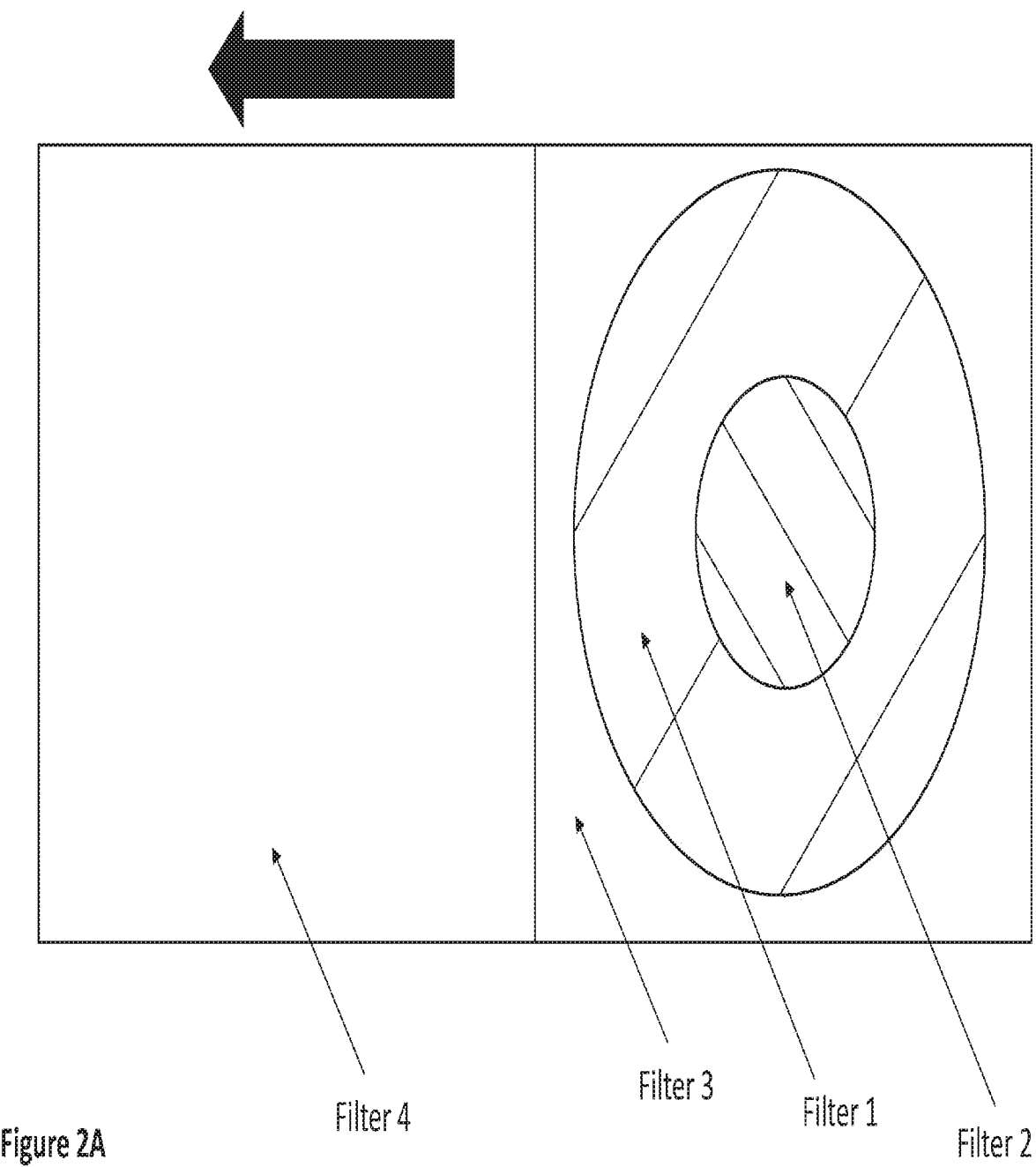
FIG. 2A is a schematic drawing illustrative of a configuration of one embodiment of a system for acquiring biometric and/or non-biometric images, shown in a front view relative to a lens.
Figure 2B:
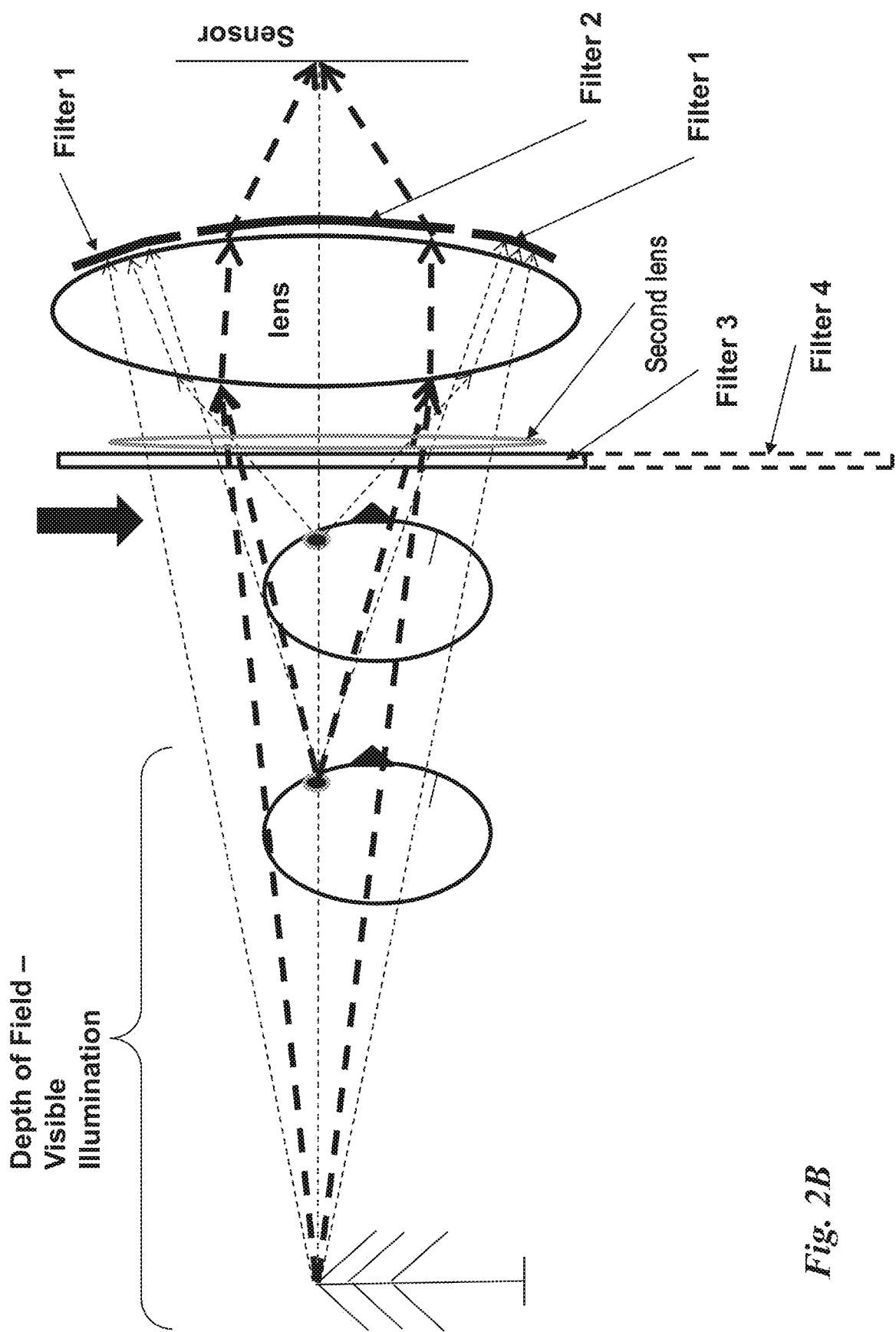
FIG. 2B is a schematic drawing illustrative of a configuration of one embodiment of a system for acquiring biometric and/or non-biometric images, shown in a cross-sectional view relative to a lens.

FIG. 2A shows one embodiment of the system. The lens may correspond to the large circular shape, and one lens portion may comprise an outer annulus covered by filter 1. Another lens portion may comprise a central disk covered by filter 2. A moveable or removable external filter 3 may be on top of (or in front of, relative to the transmission direction of illumination propagating towards) the lens. Referring to one illustrative embodiment, FIG. 2B shows focusing and/or acquisition of imagery under the configuration of FIG. 2A. The combination of filter 2 and filter 3 allows visible light to pass through the central portion of the lens and focus onto the sensor. Infra-red illumination however is blocked by filter 3 and/or filter 2.

Figure 2D:
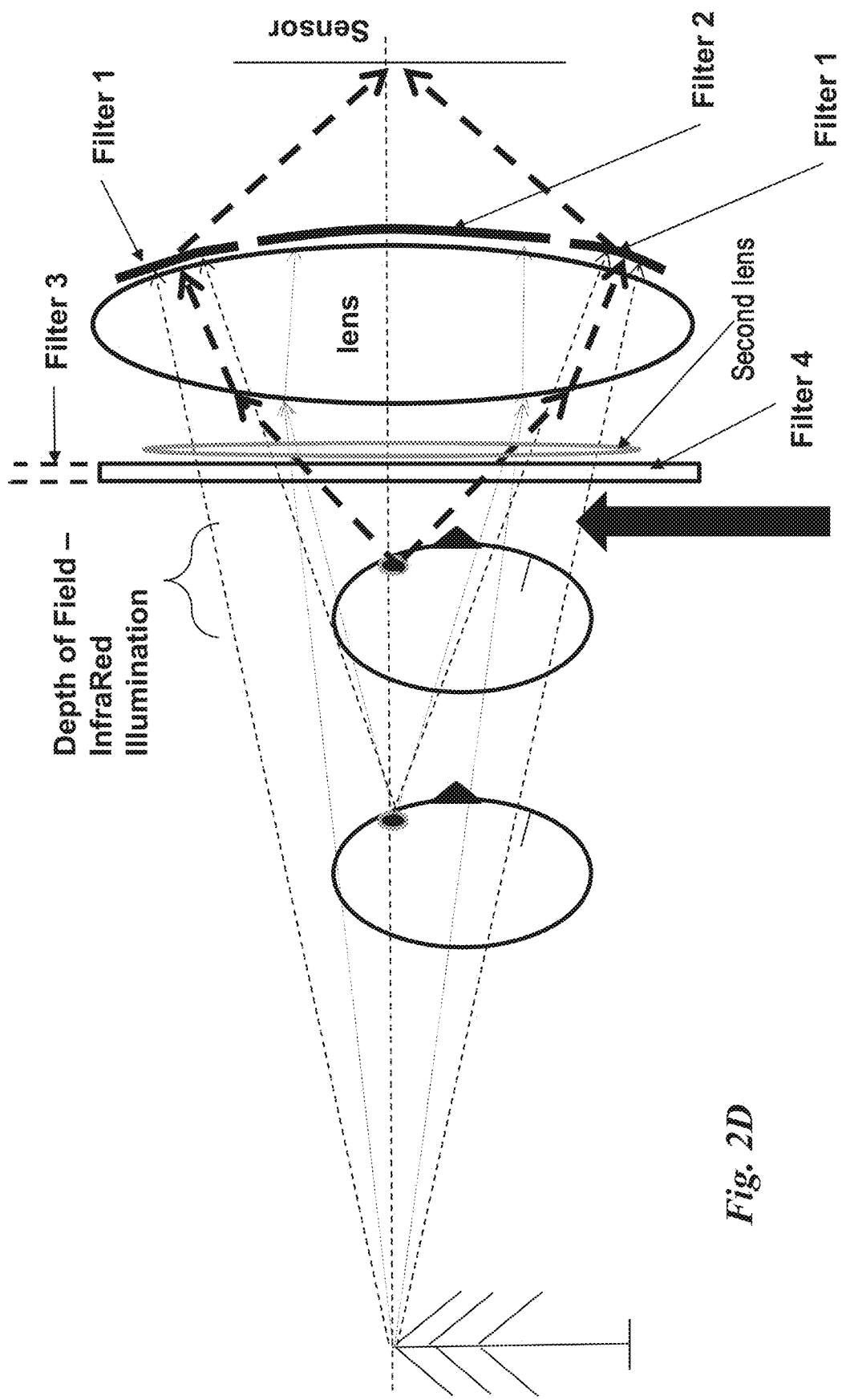
FIG. 2D is a schematic drawing illustrative of another configuration of one embodiment of a system for acquiring biometric and/or non-biometric images, shown in a cross-sectional view relative to a lens.

Referring to an illustrative embodiment, FIG. 2C shows the system configured such that the external filter material now corresponds to filter 4 (e.g., filter 4 may be moved/introduced to cover a portion of the lens, and filter 3 may be removed or prevented from covering the lens). Referring to one illustrative embodiment, FIG. 2D shows focusing and/or acquisition of imagery under the configuration of FIG. 2C. The combination of filter 1 and filter 4 may allow infra-red light (corresponding to biometric information for example) to pass through the circular annulus portion of the lens and focus onto the sensor. Visible illumination however may be blocked (e.g., over the central portion of the lens covered by filter 2, and over the annulus portion) by the filter 4 and/or 1.

In some embodiments, a switch between filter 3 and filter 4 over some portion of the lens may be performed by sliding (e.g., manually) one or more filter structures over the lens or relative to the lens. In certain embodiments, filter 3 and filter 4 may remain in place relative to the lens, and each may be selectively activated (electrically and/or mechanically) to pass/transmit or attenuate/block certain wavelengths of light. One or more of the filters described herein may each be referred as an optical filter. One or more of the filters described herein may each comprise an interference, dichroic, absorptive, Lyot, or metal mesh filter.

Each of the filters may be of any shape and size, e.g., relative to the lens, which itself may be of any shape and size. For example, a filter and/or the lens may have rectangular, square, circular and/or curved features. The shape and/or size of a filter may be configured relative to the lens, or a portion of the lens with which the filter couples (e.g., optically couples). For instance, a lens may have a circular or rectangular profile, and may comprise portions configured for different depth of fields. The lens may be machined or produced to support the multiple (e.g., dual) imaging configurations described herein. The size and/or shape of a first filter (e.g., filter 1) may be configured to correspond/conform to or cover a first portion of the lens configured for a first imaging configuration, for example. Another filter (e.g., the filter 3 and/or filter 4) may be configured to cover, completely or substantially (e.g., 80, 85, 90, 95 or 99 percent of) all of one side of the lens (e.g., where light is incident on, or emerges from).

In some embodiments, the size, shape and/or diameter(s) of the central portion/disk and/or circular annulus (e.g., inner and/or outer diameters) may be determined based on the lens' expected or configured range of focal lengths in the visible wavelength of light and/or in the IR wavelength of light. The lens' expected or configured range of focal lengths in the IR and/or visible wavelength of light may correspond to an expected or configured range of the distance of an iris, eye or subject from the system (e.g., lens) for image capture. The lens' expected or configured range of focus in the visible wavelength of light may correspond to an expected or configured range of the distance of objects (e.g., non-iris objects) from the system (e.g., lens) for image capture. In some embodiments, one portion of the lens is configured to support a first range of focal lengths (or a first depth of field) and another portion of the lens is configured to support a second range of focal lengths (or a second depth of field). In certain embodiments, one portion of the lens is configured to support a first depth of field for image acquisition using IR light and another portion of the lens is configured to support a second depth of field for image acquisition using visible light.

In some embodiments, a sensor acquires an image of an iris based on a first imaging configuration. The iris may be located within a predetermined distance relative to the sensor. The first imaging configuration may include a first filter over a first portion of a lens coupled to the sensor, and a second filter over at least the first portion that combine with the first filter to allow infra-red light from the iris to pass to the sensor. The first and/or the second filters may be located on the same side (where light in incident on, or emerges from the lens) or different sides of the lens. One or both filters may couple directly (e.g., be deposited) onto the lens. One or both filters may be disposed some distance(s) from the lens, e.g., mounted on a slider, frame or panel.

The sensor may acquire an image of an object based on a second imaging configuration. The object may be located beyond the predetermined distance. The second imaging configuration may include a third filter over a second portion of the lens, and a fourth filter replaces the second filter to combine with the third filter to allow visible light from the object to pass to the sensor. The third and/or the fourth filters may be located on the same side or different sides of the lens. One or both filters may couple directly (e.g., be deposited) onto the lens. One or both filters may be disposed some distance(s) from the lens, e.g., mounted on a slider, frame or panel.

In some embodiments, the system may include an additional lens (e.g., a thin lens) coupled on one or both of filters 3 and 4 of FIG. 2D for instance, in order to perform at least some of the re-focus of the lens between visible and infra-red. For example, a second lens may be coupled on filter 3, and a third lens may be coupled on filter 4. The second lens and the third lens may be configured to have the same or different focusing characteristic(s). For instance, different focusing characteristics may be configured corresponding to the different depths of field and/or wavelengths (e.g., IR vs visible light).

In some embodiments, filter 3 may be deposited on (or coupled to) a slider. Filter 4 may be deposited on another slider, or on another portion of the same slider. In some embodiments, a slider can move an associated filter over the lens, or away from the lens. In certain embodiments, the slider can be used to switch between filters 3 and 4, in positioning one of these filters over the lens. In some embodiments, there may be no filters deposited on (or coupled to) the lens and all the filters are deposited on (or coupled to) the slider.

In certain embodiments, the slider (e.g., filter 3 and/or filter 4) may not be present. This may allow contamination of visible illumination/light and infra-red illumination/light. Due to the different focus point of each of the infra-red and visible elements, the contamination can be acceptable (e.g. of an acceptable level) in some circumstances.

Figure 2E:
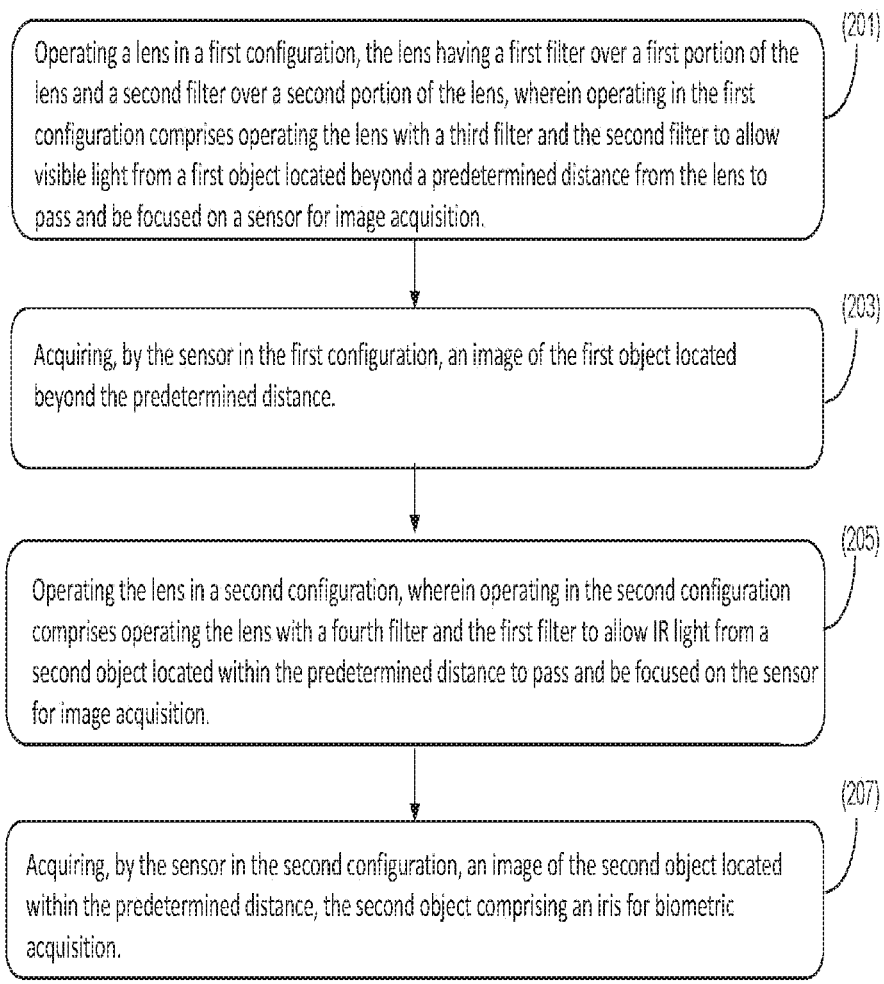
FIG. 2E is a flow diagram illustrative of one embodiment of a method for acquiring biometric and/or non-biometric images.

Referring now to FIG. 2E, one embodiment of a method for acquiring IR light and visible light images is depicted. In one or more embodiments, an imaging system includes a lens, and the lens may have a first filter over a first portion of the lens, and may have a second filter over a second portion of the lens. The method includes operating the lens in a first configuration, comprising operating the lens with a third filter and the second filter to allow visible light from a first object located beyond a predetermined distance from the lens to pass and be focused on a sensor for image acquisition (201). The sensor may acquire, in the first configuration, an image of the first object located beyond the predetermined distance (203). The lens may be operated in a second configuration, comprising operating the lens with a fourth filter and the first filter to allow IR light from a second object located within the predetermined distance to pass and be focused on the sensor for image acquisition (205). The sensor may acquire, in the second configuration, an image of the second object located within the predetermined distance (207). The second object may comprise an iris for biometric acquisition.

In some embodiments, the lens may have a first filter over a first portion of the lens, and may have a second filter over a second portion of the lens. At least one of the first filter or the second filter may be deposited on, or coupled to the lens. For example, one or both of the filters may be fused or applied onto different parts of the surface of the lens. In some embodiments, one or both of the filters are placed or secured over different parts of the outer surface of one side of the lens. In certain embodiments, the second portion of the lens comprises a central disk portion of the lens facing the sensor, and the first portion of the lens comprises an annulus portion around the central disk portion. The imaging system may operate the lens in several configurations, including at least a first configuration and a second configuration.

Referring now to 201, and in one or more embodiments, the imaging system operates the lens in a first configuration. The system may operate the lens with a third filter and the second filter to allow visible light from a first object located beyond a predetermined distance from the lens to pass and be focused on a sensor for image acquisition. The system may allow the visible light to pass through the third filter, the lens and the second filter (via the second portion), to reach the sensor. At least one of the second filter or the third filter may allow light of wavelength from 400 nm to 700 nm to pass. The at least one of the second filter or the third filter may comprise a band-pass filter.

The first filter may block some or all of the visible light from passing through or leaving the first portion of the lens. The lens, corresponding to the second portion, may focus the visible light onto the sensor (or onto visible light sensitive or visible light specific portions of the sensor). In some embodiments, the system operates a second lens coupled to the third filter, to assist the lens in focusing the visible light onto the sensor.

Referring now to 203, and in one or more embodiments, the sensor may acquire, in the first configuration, an image of the first object located beyond the predetermined distance. The sensor may acquire an image of the first object using visible light when the third filter is activated or covering the lens. A processor of the system may, for example, coordinate the image acquisition with the activation or use of the third filter in relation to the lens. The system may illuminate the object using a visible light source, for acquisition of an image of the first object. A processor of the system may, for example, coordinate the image acquisition with the illumination from the visible light source.

Referring now to 205, and in one or more embodiments, the imaging system operates the lens in a second configuration. The system may operate the lens with a fourth filter and the first filter to allow IR light from another object located within the predetermined distance to pass and be focused on the sensor for image acquisition. The system may allow the IR light to pass through the fourth filter, the lens and the first filter (via the first portion), to reach the sensor. At least one of the first filter or the fourth filter may allow light of wavelength from 750 nm to 860 nm to pass. The at least one of the first filter or the fourth filter may comprise a band-pass filter.

The second filter may block some or all of the IR light from passing through or leaving the second portion of the lens. The lens, corresponding to the first portion, may focus the IR light onto the sensor (or onto IR light sensitive or IR specific portions of the sensor). In some embodiments, the system operates another lens coupled to the fourth filter, to assist the lens in focusing the IR light onto the sensor. In some embodiments, the system operates only one of the third filter or the fourth filter over the lens at a given time. The lens may be maintained at a fixed distance from the sensor in the first configuration and the second configuration Referring now to 207, and in one or more embodiments, the sensor may acquire, in the second configuration, an image of the second object located within the predetermined distance. The second object may comprise an iris for biometric acquisition. The sensor may acquire, in the second configuration, an image of the second object located within the predetermined distance. The sensor may acquire an image of the second object using IR light when the fourth filter is activated or covering the lens. A processor of the system may, for example, coordinate the image acquisition with the activation or use of the fourth filter in relation to the lens. The system may illuminate the object using an IR light source, for acquisition of an image of the second object. A processor of the system may, for example, coordinate the image acquisition with the illumination from the IR light source.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

It should be noted that certain passages of this disclosure can reference terms such as "first" and "second" in connection with filters, sensors, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system.

I claim:

1. A system, comprising:
   a sensor; and
   a lens configured to operate in at least a first configuration and a second configuration, the lens having a first filter over a first portion of the lens and a second filter over a second portion of the lens, wherein:
   in the first configuration, a third filter operates with the lens and the second filter to allow visible light from a subject located beyond a predetermined distance from the lens to pass and be focused on the sensor for image acquisition; and
   in the second configuration, a fourth filter operates with the lens and the first filter to allow IR light from an iris located within the predetermined distance to pass and be focused on the sensor for image acquisition.

2. The system of claim 1, wherein the iris located within the predetermined distance comprises an iris being imaged for biometric authentication.

3. The system of claim 1, wherein at least one of the second filter or the third filter comprises a band-pass filter configured to allow light of wavelength from 400 nm to 700 nm to pass.

4. The system of claim 1, wherein at least one of the first filter or the fourth filter comprises a band-pass filter configured to allow light of wavelength from 750 nm to 860 nm to pass.

5. The system of claim 1, wherein the lens is disposed at a fixed distance from the sensor in the first configuration and the second configuration.

6. The system of claim 1, wherein the second portion of the lens comprises a central disk portion of the lens facing the sensor, and the first portion of the lens comprises an annulus portion around the central disk portion.

7. The system of claim 1, wherein one of the third filter or the fourth filter is operative over the lens at a given time.

8. The system of claim 1, further comprising an IR light source, the IR light source configured to illuminate the iris for image acquisition in the second configuration.

9. The system of claim 1, further comprising a second lens coupled to the third filter or the fourth filter, the second lens configured to assist the lens in focusing the visible light onto the sensor if coupled to the third filter, or focusing the IR light onto the sensor if coupled to the fourth filter.

10. The system of claim 1, wherein at least one of the first filter or the second filter is deposited on the lens.

11. A method comprising:
operating a lens in a first configuration, the lens having a first filter over a first portion of the lens and a second filter over a second portion of the lens, wherein operating in the first configuration comprises operating the lens with a third filter and the second filter to allow visible light from a subject located beyond a predetermined distance from the lens to pass and be focused on a sensor for image acquisition; and
operating the lens in a second configuration, wherein operating in the second configuration comprises operating the lens with a fourth filter and the first filter to allow IR light from an iris located within the predetermined distance to pass and be focused on the sensor for image acquisition.

12. The method of claim 11, further comprising acquiring, by the sensor in the second configuration, an image of the iris located within the predetermined distance, the iris comprising an iris being imaged for biometric authentication.

13. The method of claim 11, comprising allowing, by at least one of the second filter or the third filter, light of wavelength from 400 nm to 700 nm to pass, the at least one of the second filter or the third filter comprising a band-pass filter.

14. The method of claim 11, comprising allowing, by at least one of the first filter or the fourth filter, light of wavelength from 750 nm to 860 nm to pass, the at least one of the first filter or the fourth filter comprising a band-pass filter.

15. The method of claim 11, further comprising maintaining the lens at a fixed distance from the sensor in the first configuration and the second configuration.

16. The method of claim 11, wherein the second portion of the lens comprises a central disk portion of the lens facing the sensor, and the first portion of the lens comprises an annulus portion around the central disk portion.

17. The method of claim 11, comprising operating one of the third filter or the fourth filter over the lens at a given time.

18. The method of claim 11, further comprising illuminating, by an IR light source, the iris for image acquisition in the second configuration.

19. The method of claim 11, further comprising operating a second lens coupled to the third filter or the fourth filter, to assist the lens in focusing the visible light onto the sensor if coupled to the third filter, or in focusing the IR light onto the sensor if coupled to the fourth filter.

20. The method of claim 11, wherein at least one of the first filter or the second filter is deposited on the lens.

* * * * *